US012190337B2

United States Patent
Soltangheis et al.

(10) Patent No.: US 12,190,337 B2
(45) Date of Patent: Jan. 7, 2025

(54) QUANTITATIVE METHOD TO TRACK THE DEMAND IN THE ART MARKET INDEPENDENTLY FROM AUCTION DATA

(71) Applicant: WONDEREUR INC., Toronto (CA)

(72) Inventors: Mina Soltangheis, Toronto (CA); Tomas Tokar, Calgary (CA)

(73) Assignee: WONDEREUR INC., Toronto (CA)

( * ) Notice: Subject to any disclaimer, the term of this patent is extended or adjusted under 35 U.S.C. 154(b) by 69 days.

(21) Appl. No.: 17/734,923

(22) Filed: May 2, 2022

(65) Prior Publication Data

US 2022/0374926 A1 Nov. 24, 2022

Related U.S. Application Data

(60) Provisional application No. 63/182,628, filed on Apr. 30, 2021.

(51) Int. Cl.
*G06Q 30/0202* (2023.01)
*G06Q 30/0201* (2023.01)
(Continued)

(52) U.S. Cl.
CPC ..... *G06Q 30/0202* (2013.01); *G06Q 30/0201* (2013.01); *G06Q 30/0282* (2013.01); *G06Q 40/06* (2013.01)

(58) Field of Classification Search
CPC .......................................... G06Q 10/00–50/00
(Continued)

(56) References Cited

U.S. PATENT DOCUMENTS 8,736,612 B1 * 5/2014 Goldman ............ G06F 16/9024
345/440
11,301,927 B2 * 4/2022 Mazor ................ G06Q 30/0625
(Continued)

FOREIGN PATENT DOCUMENTS

WO  WO 2011/080347 A1  7/2011
WO  WO 2013/165583 A1  11/2013

OTHER PUBLICATIONS

Https://web.archive.org/web/20210206230444/https://en.wikipedia.org/wiki/Hyperparameter_(machine_learning) (Year: 2021).*
(Continued)

*Primary Examiner* — Alan S Miller
(74) *Attorney, Agent, or Firm* — Sterne, Kessler, Goldstein & Fox P.L.L.C.

(57) ABSTRACT

Disclosed herein is a method of measuring demand in a market. The method gathers data representing events defining relationships between producers and institutions. Each event includes information defining at least a time of event and a type of event. The method determines a trajectory for each producer. Based on the trajectory for each producer, the method generates a dynamic graph specifying the relationships between producers and institutions for a hyperparameter time period. From the dynamic graph, the method generates a projection graph specifying only the relationships between institutions. The method determines a trajectory score for each producer and a performance score for each institution. The trajectory score for a producer is a summation of a rating of each institution that has a relationship with that producer. The performance score for an institution is a summation of a delta trajectory score of each producer that has a relationship with that institution.

18 Claims, 5 Drawing Sheets

(51) Int. Cl.
*G06Q 30/0282* (2023.01)
*G06Q 40/06* (2012.01)

(58) Field of Classification Search
USPC .............................................. 705/7.11–7.42
See application file for complete search history.

(56) References Cited

U.S. PATENT DOCUMENTS

| | | | |
|---|---|---|---|
| 11,315,127 B2* | 4/2022 | MacDonald-Korth | ...................... G06Q 30/0278 |
| 2008/0004969 A1* | 1/2008 | Shniberg | ................ G06Q 30/08 705/26.42 |
| 2012/0124058 A1* | 5/2012 | Wachtel | ................ G06F 16/954 707/748 |
| 2013/0041721 A1* | 2/2013 | Neuendorf | ............. G06Q 40/06 705/7.35 |
| 2015/0120580 A1* | 4/2015 | Pabst | .................... G06Q 50/10 705/306 |
| 2016/0330580 A1* | 11/2016 | Navarro | ............. G06Q 30/0641 |
| 2017/0337621 A1* | 11/2017 | Peters | .................. G06Q 20/123 |
| 2018/0330432 A1* | 11/2018 | Mazor | ..................... H04L 67/12 |

OTHER PUBLICATIONS

International Search Report directed to PCT Application No. PCT/IB2022/054053, Aug. 15, 2022, 9 pages.

\* cited by examiner

US 12,190,337 B2

QUANTITATIVE METHOD TO TRACK THE DEMAND IN THE ART MARKET INDEPENDENTLY FROM AUCTION DATA

FIELD

The present disclosure relates to a method for measuring demand in an art market independently from transactions of buyers at auction.

BACKGROUND

Investors rely heavily on data to understand the state of a market and to assess risk and performance of the market to support investment making decisions. Security market indexes were first introduced as a simple measure to reflect the performance of the stock market. Since then, security market indexes have evolved into important multi-purpose tools that help investors track the performance of various security markets, estimate risk, and evaluate the performance of investment managers.

There are algorithms that capture the performance of the financial market. However, the art market is different from the financial market and therefore requires different tools. Because art is a passion asset, most investors wish to buy art that they can invest in but also that they like. Therefore, personal taste and the uniqueness of each piece of art play an important part in the transactions of the art market. Moreover, there is little transparency in the primary art market, where sales are done privately and the prices are often kept private. In the secondary market, auction data may be publically available but only comprises a small fraction of artists in the art market that are outside the budget range or cannot be purchased by most investors. Furthermore, auction data is volatile, manipulated, and disconnected from intrinsic art values.

Due to these differences between the dynamics of the art market and the financial market, existing art indices that attempt to use the same techniques used in the financial market indices fail to be representative, reliable, or actionable for the art market. For example, existing art indices (e.g., Sotheby's Mei Moses, Artnet indices, AMR index) are constructed based on repeated auction transactions that fail to represent the majority of the artists active in the art market but do not go through the auction process. Furthermore, existing art indices fail to take into consideration drivers of value in the existing network structure of the art market. In the art world, museums, galleries, and collectors are often closely connected and influential to the value of artists whose artwork is collected or shown. Buyers in the art market may also impact the value of artwork through transactions not conducted through auctions. For example, the impact and leadership of museums is widely recognized in the art market as influential in impacting the value and marketability for an artist that a museum "invests" in through exhibitions and acquisitions. The more influential a museum is, the more significant its impact may be on the value of artists. These network effects form the core of the art market but is not considered by the existing indices of the art market, which are mostly based solely on auction prices. Therefore, a new method for measuring demand in the art market independently from transactions of buyers at auction is needed.

BRIEF SUMMARY

Disclosed herein are system, apparatus, device, method, and/or computer program product embodiments, and/or combinations and sub-combinations thereof for measuring demand in the art market independently from transactions of buyers at auction. In particular, a method determines the state of the market by integrating the global network characteristics of the art market and focusing on the behavior of market influencers, such as museums and art institutions. The decisions of these market influencers have an impact on the rest of the art market and on the artists' value. In the case of emerging artists for whom transaction data is missing or auction data is lacking, the impact of market influencers is especially important to take into consideration. Therefore, the method for measuring artists' value is reflective of the impact of art market network influencers and is applicable to all artists in the market, not just those artists with artwork transactions in auctions. Furthermore, the method uses the measured demand in the art market to discover and recommend opportunities to investors to buy or invest in artwork that is tailored to the investors' personalized taste.

In some embodiments, a method for measuring demand in a market includes gathering data representing a plurality of events defining relationships between a plurality of producers and a plurality of institutions. Each event includes information defining at least a time of event and a type of event. The method may determine a trajectory for each producer of the plurality of producers such that the trajectory for a particular producer includes a group of events of the plurality of events that involve the particular producer. Based on the trajectory for each producer of the plurality of producers, the method may generate a dynamic graph specifying the relationships between the plurality of producers and the plurality of institutions for a hyperparameter time period. From the dynamic graph, the method may generate a projection graph such that the projection graph specifies only the relationships between institutions of the plurality of institutions. The method may determine a trajectory score for each producer and determine a performance score for each institution. The trajectory score for the particular producer is a summation of a rating of each institution that has a relationship with the particular producer over the hyperparameter time period. The performance score for a particular institution is a summation of a delta trajectory score of each producer that has a relationship with the particular institution over the hyperparameter time period.

In some examples, the method may determine the trajectory score for the particular producer by applying a weight to the rating of each institution that has a relationship with the particular producer. The weight may be a function that is assigned based on the type of event of the relationship between each institution and the particular producer.

In some examples, the method may further select a category of producers and determine a total trajectory score for the category of producers. The category of producers is selected from the plurality of producers based on a first characteristic that is common to the category of producers. The total trajectory score is a summation of the trajectory score for each producer in the category of producers over the hyperparameter time period.

In some examples, the method may further select a category of institutions and determine a proportional demand value. The category of institutions is selected from the plurality of institutions based on a second characteristic that is common to the category of institutions. The proportional demand value is the total trajectory score divided by a summation of the trajectory scores for each producer in the plurality of producers over the hyperparameter time period.

In some examples, the category of institutions is selected based on at least one of the performance score for each institution and PageRank centrality algorithms.

In some examples, the method may further recommend, to an investor, to invest in an institution having at least one of a high proportional demand value or a high performance score.

In some examples, the method may further generate the rating for each institution of the plurality of institutions specified in the projection graph by identifying a target institution, identifying connecting institutions, and determining the rating for each connecting institution. The target institution is identified from the plurality of institutions on the projection graph and has a hyperparameter target rating. The connecting institutions are connected to the target institution on the projection graph. The rating for each connecting institution is determined based on how many connections each connecting institution has to other institutions on the projection graph. If a connecting institution has a low number of connections to other institutions on the projection graph, that connecting institution inherits a rating that is closer to the target rating. On the other hand, if a connecting institution has a high number of connections to other institutions on the projection graph, that connecting institution inherits a rating that is further from the target rating.

In another embodiment, a system for measuring demand in a market includes a memory for storing instructions and one or more processors, communicatively coupled to the memory, configured to execute the instructions. The instructions cause the one or more processors to gather data representing a plurality of events defining relationships between a plurality of producers and a plurality of institutions. Each event includes information defining at least a time of event and a type of event. The processor may determine a trajectory for each producer of the plurality of producers such that the trajectory for a particular producer includes a group of events of the plurality of events that involve the particular producer. Based on the trajectory for each producer of the plurality of producers, the processor may generate a dynamic graph specifying the relationships between the plurality of producers and the plurality of institutions for a hyperparameter time period. From the dynamic graph, the processor may generate a projection graph such that the projection graph specifies only the relationships between institutions of the plurality of institutions. The processor may determine a trajectory score for each producer and determine a performance score for each institution. The trajectory score for the particular producer is a summation of a rating of each institution that has a relationship with the particular producer over the hyperparameter time period. The performance score for a particular institution is a summation of a delta trajectory score of each producer that has a relationship with the particular institution over the hyperparameter time period.

In yet another embodiment, a non-transitory, tangible computer-readable device has instructions stored thereon that, when executed by at least one computing device, causes the at least one computing device to perform operations. The at least one computing device gathers data representing a plurality of events defining relationships between a plurality of producers and a plurality of institutions. Each event includes information defining at least a time of event and a type of event. The at least one computing device may determine a trajectory for each producer of the plurality of producers such that the trajectory for a particular producer includes a group of events of the plurality of events that involve the particular producer. Based on the trajectory for each producer of the plurality of producers, the at least one computing device may generate a dynamic graph specifying the relationships between the plurality of producers and the plurality of institutions for a hyperparameter time period. From the dynamic graph, the at least one computing device may generate a projection graph such that the projection graph specifies only the relationships between institutions of the plurality of institutions. The at least one computing device may determine a trajectory score for each producer and determine a performance score for each institution. The trajectory score for the particular producer is a summation of a rating of each institution that has a relationship with the particular producer over the hyperparameter time period. The performance score for a particular institution is a summation of a delta trajectory score of each producer that has a relationship with the particular institution over the hyperparameter time period.

Descriptions provided in the summary section represent only examples of the embodiments. Other embodiments in the disclosure may provide varying scopes different from the description in the summary.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
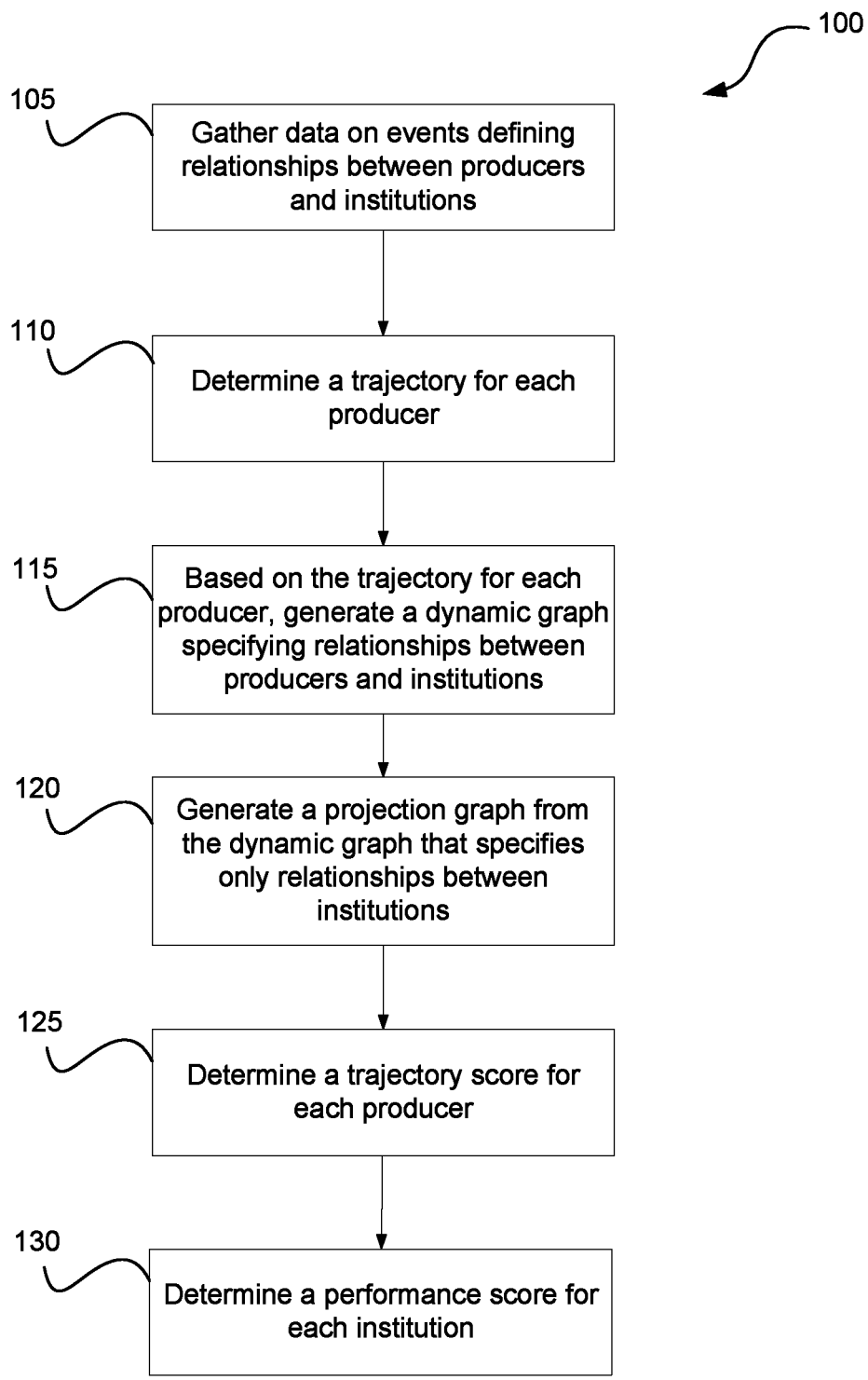
FIG. 1 shows a flowchart illustrating a method for determining a trajectory score for producers and a performance score for institutions in a global market network, according to an embodiment of the present disclosure.

Embodiments of the present disclosure enable demand to be tracked more efficiently. By avoiding the need to use auction data, embodiments provide a technical improvement in the processing of the computer system. It avoids the need for volatile and inaccurate auction data. In addition, integrating global network characteristics offer technical improvements as well. It efficiently eliminates the transactions needed to identify buy and sell opportunities. It also provides an efficient algorithm for searching and rating purchase opportunities at a global market level that are personalized based on the preference of the buyer for various groups of artists or institutions.

To identify influencers in the market and to measure their impact factor, methods of the present disclosure construct a latent network of stakeholders, such as buyers, sellers, museums and art institutions that drive the values in the art market. To calculate the influence of each institution such that the evolving influence of each institution over time is captured, methods of the present disclosure gather the history of all events in artists' careers into a set of events. Each event includes information regarding the type of the event, the time of the event, and the institutions and artists participating in the event. Consequently, a trajectory for each artist j may be defined.

Using artist trajectories, methods of the present disclosure define a dynamic graph and a projection graph. The projection of a graph with different types of nodes allows compression of the information about the entire network and reduction of the number of node types. In order to remove nodes of one type, two nodes of one type are connected only when they have at least one common neighboring node of a different type. To create such connections, additional qualifying conditions may be imposed based on the attributes of the nodes and edges. The dynamic influence of each institution is measured by PageRank centrality of nodes in the projection graph and is denoted as PR henceforth. PageRank is a way of rating web pages and measuring the importance of website pages based on the entire graph of the web. The intuition behind PageRank centrality is simple: the more important websites are likely to receive more links from other websites. Therefore, a page is ranked higher if the sum of the ratings of backlinks to the page is high. Therefore, both the number and quality of links to a page determine a rough estimate of how important the website is. PageRank was originally proposed as an indicator of the traffic over each node and node visits. In the present disclosure, PageRank is used as a dynamic measure for the influence and importance of institutions in the projection graph.

Next, by utilizing $PR_i$ scores associated with each institution i at any given time t, methods of the present disclosure may determine a score for the trajectory of each artist. As artists grow, their trajectories evolve and therefore the score associated with the trajectory should also evolve over time. Methods of the present disclosure may assign a weight function W(c) to any class of events. This allows the methods to score the same trajectory differently based on the significance associated with each type of event. Moreover, in this model, the more frequent visits to more significant nodes in the network result in higher growth in an artist's score.

Using the time-dependent scores of artists determined as explained above, methods of the present disclosure may measure a performance of each institution i at any given time t. The performance of each institution i at any given time t is measured by comparing the growth of the artists who have exhibited in that institution at year t with their growth afterwards in $t+\epsilon$, where $\epsilon>0$ is a hyper parameter controlling the time window we allow for the artist trajectory scores to change. This score can be an indicator of the curatorial power of the institution in identifying artists who are likely to grow over E period of time. Using the measured performance scores, institutions can show high performance under different scenarios. For example, two institutions $i_1$, $i_2$ at time t with equal and high performance scores may acquire that score in different scenarios, as explained below.

In a first scenario, institution $i_1$ takes artists with relatively better trajectories and higher trajectory scores. In the art market, these are artists who have already established themselves in their careers and are well-known. These artists are more likely to have influential events in more influential institutions, and these influential events translate into a big change in artists' trajectory score. Therefore, these artists are more likely to show significant growth and yield a higher performance score for an institution.

In a second scenario, institution $i_2$ takes in artists with smaller trajectories and lower trajectory scores. In the art market, these are considered to be emerging artists. Institution $i_2$ then helps these artists grow by promoting them and propelling their careers forward, which in turn leads to more events at more significant institutions yielding a high performance score for institution $i_2$.

Although these two institutions get equal performance scores, the score does not differentiate the different roles they play in the market. Measuring performance such that it reflects this differentiation is particularly important when facilitating investment decisions. Based on risk propensity and budget constraints of the investors/buyers, they may prefer to focus on a particular category. Hence, providing performance scores specific to each category of artists (e.g. established vs emerging) can facilitate identifying institutions and artists to invest in.

An algorithm for recommending artists for investment will now be described.

A demand index for a specific group of artists $A_c$ from a group of institutions $I_c$ at each time t may be determined. This demand index is independent from auction data and takes into consideration the significance of events by utilizing an artist's trajectory scores. The artist's trajectory score is also measured through non-auction signals and therefore can be computed for any artist's trajectory. The use of the artist trajectory score in the present disclosure may be replaced by valuations for an artist generated by an appraisal model. Such an appraisal model is described in U.S. Prov. Patent App. No. 63/182,556 filed Apr. 30, 2021, incorporated by reference herein.

The main aim of the demand index is to provide an indication of the evolution of demand from a specific group of museums/institutions for a specific category of artists. A specific group of artists, $A_c$, can be defined ad hoc by users based on their preferences or based on specific artists' attributes such as gender, medium, etc. This will allow indices to be specific to the tendencies and preferences of the users. Similarly, to further personalize, users can impose a specific group of institutions. Alternatively, when no external preferences are imposed, a specific group of institutions, $I_c$, can be selected based on an algorithm that allows incorporation of the following attributes in the filtering process: 1) the institution's prestige/influence, 2) the institution's performance (i.e., how good an institution is at choosing artists whose acclaim will grow within a time period), 3) an institution's tendency to collect a specific category of artists (e.g., categories of artists include gender, medium, etc.), and 4) an institution's risk profile (i.e., the institution's propensity to collect an artist before other museums). It should be noted that an institution's performance, tendency, and risk profile may change over time.

For each category of artists (e.g. emerging vs established), each institution i is defined by a vector of attributes. Here we consider influence and performance of the institutions. The performance scores used at this step are specific to each artist category to incorporate the risk profile of the institutions. For example, for each institution, performance can be defined for an emerging artist category that indicates higher risk propensity vs performance with regards to established artists that indicate lower risk category. The objective is to find k institutions that are both highly influential and also with high performance scores. These institutions are the drivers of trends and demand in the market more than others. The algorithm identifies these k institutions. Each institution is represented on a PR*–P* plane (wherein P represents the performance of institutions) and k institutions with the smallest distance from the optimal vector (default is (1,1)) are selected as $I_c$. These lists of recommended institutions can be used for the demand index. However, they can also be used directly by investors who are looking for ways to filter their search scope (to k institutions) for discovery of artists. Furthermore, we expand the same approach to recommend artists in addition to institutions. From the institutions identified in the previous step, for each category of artist, the $top_n(S_{j \in Ac}\{A^*_j\})$ represents the n artists with the highest acclaim (i.e., trajectory score) among all artists who had events in any of the $I_c$ institutions. $I_c$ institutions were selected as described earlier such that they have high influence and performance scores. This strategy is particularly useful for buyers who are interested to discover emerging artists. Those artists typically don't have auction transactions and therefore market reports based on auction data can be misleading and don't offer a path to discovering artists to buy. This strategy also provides analysis for each artist category, e.g. emerging vs. established, which allows for recommendations for buyers with different risk preferences. Moreover, the target rating as described above may be used to find artists who have visited institutions with closer target ratings to the selected $I_c$ institutions. The proximity of an artist to a target is defined based on the target rating of the institutions visited by that artist in a hyperparameter time period. For example, in the last 3 years of an artist's trajectory, the institution with the highest target rating for the selected $I_c$ institutions can be defined as the proximity of an artist to the target institution. Therefore, one can recommend artists based on a target. Using target ratings allows methods of the present disclosure to recommend artists who are getting closer to a defined target rating. The target group may be defined based on various factors, similar to what has been discussed above.

FIG. 1 shows a flowchart illustrating a method 100 for determining a trajectory score for producers and a performance score for institutions in a global market network, according to an embodiment of the present disclosure. Some operations of method 100 may be performed in a different order and/or vary, and method 100 may include more operations that are not described herein for simplicity.

Referring to FIG. 1, at step 105, method 100 gathers data on events defining relationships between producers and institutions in a global market network. In some embodiments, method 100 may gather data on events by searching through available databases (e.g., CVs of artists available on the internet) containing a history of all events that producers in the market have attended in the past. Each event may contain information defining the event, such as a producer associated with the event, an institution participating in the event, a time that the event took place, a categorical type of the event (e.g., exhibitions, shows, collections, auctions, etc.), and so forth. It should be understood by those skilled in the art that each event may contain other information in various embodiments of the present disclosure and not exhaustively listed herein.

A set of events Ω may be defined by the following equation:

$$\Omega = \{(i, a, t_e, c) | i \in I, a \in A\} \quad \text{(Equation 1)}$$

Wherein i is the institution (e.g., museum) participating in an event, wherein the institution i participating in the event belongs to a group I containing all institutions in the global market network.

a is the producer (e.g., artist) participating in an event, wherein the producer a participating in the event belongs to a group A containing all producers in the global market network.

$t_e$ is the time of an event (e.g., date of event).

c is the type of an event (e.g., exhibition, show, collection, auction, etc.).

In some embodiments, method 100 may use natural language processing to search for events across various sources and databases. Furthermore, method 100 may use jaro-winkler distance analysis to determine a distance between similar strings. This allows method 100 to efficiently and effectively discover all forms and alterations of names for events and participating producers and institutions of those events across various sources and databases. Information in each event defines a relationship between a producer and an institution in the global market network and is used to generate a dynamic graph illustrating such relationships, as explained in further detail below with reference to FIG. 2.

At step 110 in FIG. 1, method 100 determines a trajectory for each producer participating in events in the global market network. In some embodiments, the trajectory for a particular producer may include a union of a subset of events that involve the particular producer, wherein the subset of events involving the particular producer belongs to the set of all events Ω. For example, a trajectory T for a producer j may be defined by the following equation:

$$T_j = \bigcup_{(i,a,t_e,c) \in \Omega} \{(i, t_e, c) | a = j\} \quad \text{(Equation 2)}$$

Figure 2:
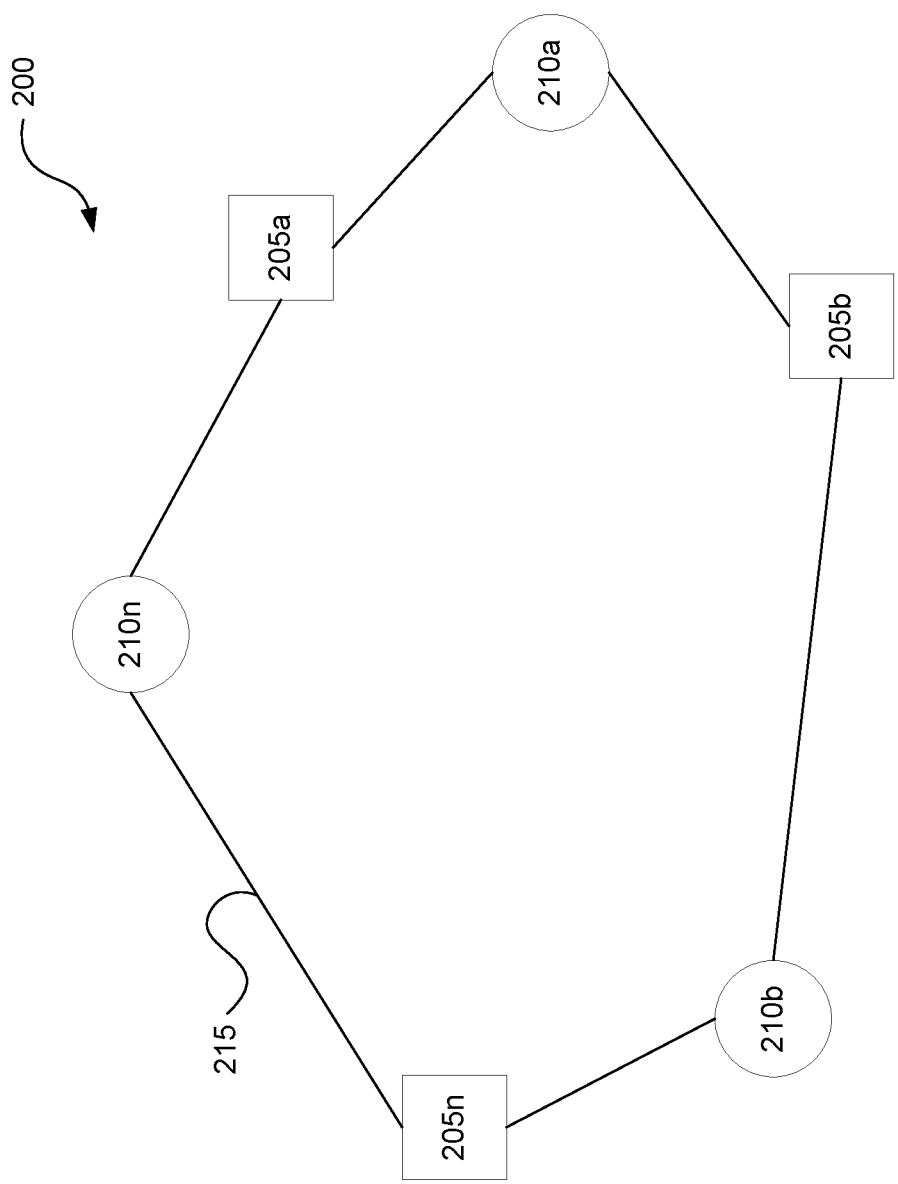
FIG. 2 shows a dynamic graph illustrating relationships between producers and institutions in the global market network according to an embodiment of the present disclosure.

At step 115 in FIG. 1, method 100 uses the organized data in artist trajectories T for each producer j to generate a dynamic graph illustrating relationships between producers and institutions in the global market network. In some embodiments, method 100 generates the dynamic graph for a hyperparameter time period, which may be adjusted in various embodiments of the present disclosure to generate different dynamic graphs. For example, method 100 may set the hyperparameter time period to be three years. In this scenario, the dynamic graph will illustrate only those producers and institutions that are connected by events having a time of event to within the past three years from the present date (or three years from a chosen time). It should be understood by those skilled in the art that various time periods may be set as the hyperparameter time period in various embodiments of the present disclosure. FIG. 2 shows an exemplary dynamic graph 200 for a predetermined hyperparameter time period according to an embodiment of the present disclosure.

Referring to FIG. 2, dynamic graph 200 includes nodes linked through events defined by the set of events Ω, as explained above. In some embodiments, the nodes forming dynamic graph 200 may include producers 205 and institutions 210. For example, producers 205 may be artists and institutions 210 may be art galleries, museums, auction houses, etc. When a producer 205 interacts with an institution 210 through an event Ω (e.g., when an artist shows artwork at an art gallery), a relationship 215 is formed, connecting that producer 205 and that institution 210 in dynamic graph 200. In some embodiments (not depicted), multiple producers 205 may form relationships 215 with a single institution 210, and multiple institutions 210 may form relationships 215 with a single producer 205. It should be understood by those skilled in the art that dynamic graph 200 may include any number 205a-205n of producers 205 and any number 210a-210n of institutions 210. Furthermore, dynamic graph 200 may include relationships 215 between two producers 205, two institutions 210, and a producer 205 and an institution 210. It should be understood that the configuration of dynamic graph 200 depicted in FIG. 2 is for illustrative purposes only and not intended to be exhaustive or limiting on the teachings of the present disclosure.

Figure 3:
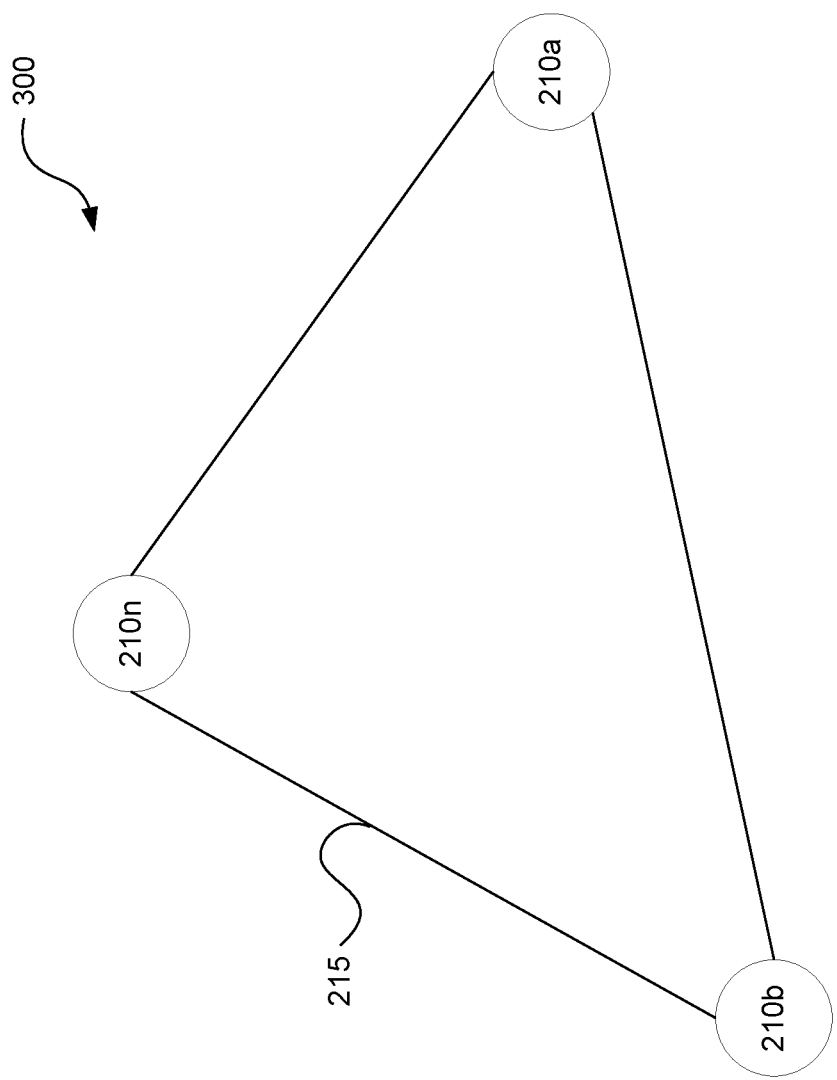
FIG. 3 shows a projection graph illustrating relationships between institutions in the global market network according to an embodiment of the present disclosure.

Referring back to FIG. 1, at step 120, method 100 uses the dynamic graph 200 generated in step 115 to generate a projection graph illustrating only relationships between institutions in the global market network. Similar to the dynamic graph 200 that is generated for a hyperparameter time period, the projection graph may also be generated for a hyperparameter time period that may be adjusted in various embodiments of the present disclosure. FIG. 3 shows a projection graph 300 illustrating relationships between institutions in the global market network according to an embodiment of the present disclosure.

As shown in FIG. 3, projection graph 300 illustrates only relationships 215 between institutions 210. Method 100 generates projection graph 300 by absorbing all producers 205 in dynamic graph 200 and connecting institutions 210 with at least one common producer 205. For example, referring to dynamic graph 200 in FIG. 2, institution 210a and institution 210b both form relationships 215 with a common producer 205b. Therefore, in projection graph 300 in FIG. 3, common producer 205b is absorbed and institution 210a is directly connected to institution 210b via relationship 215. This process is repeated until all producers 205 in dynamic graph 200 are absorbed such that projection graph 300 only illustrates relationships 215 between institutions 210.

For example, dynamic graph 200 ($G_t$) may be defined by the following equation:

$$G_t=(I_t, A_t, E_t) \quad \text{(Equation 3)}$$

Wherein $I_t$ is the set of all institutions 210 in dynamic graph 200.
$A_t$ is the set of all producers 205 in dynamic graph 200.
$E_t$ is the set of all relationships 215 in dynamic graph 200 that correspond with events $\Omega$ that occur within the hyperparameter time period across trajectory T of producers 205.

For dynamic graph 200 defined in Equation 3 above, projection graph 300 may be defined as an institution projection of dynamic graph 200, wherein for each link connecting producers 205 and institutions 210 in dynamic graph 200, projection graph 300 will reduce the links in the dynamic graph 200 such links in the projection graph 300 will associate institutions 210 that have links to common producers 205 within a hyperparameter time period $\tau$ (e.g., a pair of museums that hosted events with a common artist within 3 years will be connected in the projection graph 300).

$\tau$ defines the hyperparameter time period. It should be understood by those skilled in the art that adjusting time $\tau$ changes the hyperparameter time period in various embodiments of the present disclosure. Bigger values for $\tau$ will lead to a denser projection graph 300 and smaller values for $\tau$ will result in sparser links because artists normally do not have events every year, so there will be gap years between events.

Allowing $\tau$ to be more than one year helps the projection graph 300 reflect the reality of the gap years. Additionally, these links can be weighted such that the weight encodes how far apart in time a pair of events for each artist occurs. In this scenario, the weight may be inversely weighted to the temporal distance between the two events of the pair of events.

Creating projection graph 300 from dynamic graph 200 allows method 100 to compress data and information of the global market network by reducing the number of node types, thereby allowing for higher effectiveness and efficiency.

Each institution 210 in projection graph 300 is ranked according to its dynamic importance/influence in the global market network. In some embodiments, the dynamic importance/influence of each institution 210 is determined via PageRank centrality algorithms. PageRank centrality algorithms are used to rate the importance of specific webpages in an entire graph of all webpages on the Internet. The rating of each webpage is determined based on 1) the amount of traffic to the webpage, and 2) the rating of other webpages that link to the webpage. In the present embodiment, PageRank centrality algorithms may be used to determine a ranking of importance of each institution 210 in projection graph 300.

In other embodiments, target push ranking algorithms may be used to determine a rating of importance of each institution 210 in projection graph 300 instead of PageRank centrality algorithms. In these embodiments, a target institution having a target rating may initially be identified from the projection graph 300. Next, all connecting institutions having a relationship 215 with the target institution may be identified. The rating of each connecting institution is then determined based on how many connections that connecting institution has to other institutions on the projection graph 300. If a connecting institution has a low number of connections to other institutions on the projection graph 300, then that connecting institution will inherit a rating that is closer to the target rating of the target institution. On the other hand, if a connecting institution has a high number of connections to other institutions on the projection graph 300, then that connecting institution will inherit a rating that is further from the target rating of the target institution. This process is continued until a rating is determined for all institutions 210 on projection graph 300. In some embodiments, a target push ranking algorithm may be defined by the equations explained in further detail below.

For any identified group of target institutions, first the method absorbs all the target nodes into a super node in the projection graph that inherits all the links from the group. The newly formed target node t will have a hyperparameter initial rating value and this value will be propagated down to the rest of the nodes until the rating value of the nodes with the highest priority to propagate do not change more than a hyperparameter value $\varepsilon$. The priority of each node is tracked in a priority queue via a p(u) score for each node u.

A priority queue function is used to determine the node with the highest priority of value propagation for an institution using p(u) score for each institution u. This function is needed for target push ranking algorithms to efficiently propagate values through large projection graphs 300.

s(u) is a function that keeps track of a current rating score for each institution u.

To define delta s, for any given node w that has the highest priority value p(w) in the priority queue, the in-bound neighbors must be found.

The rating of each connecting institution having a relationship 215 with two connecting example institutions u1 and u2 to the selected institution w may be defined by the following equations:

$$\text{delta } s(u1) = (1-\alpha) * 1/|\text{out}(u1)| * p(w) \quad \text{(Equation 4)}$$

$$\text{delta } s(u2) = (1-\alpha) * 1/|\text{out}(u2)| * p(w) \quad \text{(Equation 5)}$$

Wherein $\alpha$ is a hyperparameter that allows the target push ranking algorithm to restart if stuck in an infinite loop.

u1 is a first connecting institution having a relationship 215 with the target institution.

u2 is a second connecting institution having a relationship 215 with the target institution.

out(u1) is the number of connections the first connecting institution u1 has to other institutions in projection graph 300.

out(u2) is the number of connections the second connecting institution u2 has to other institutions in projection graph 300.

s(u) is the function keeping track of a current rating for each connecting institution and will be updated for the u1 and u2 nodes by adding the associated delta s scores to the existing s score for each node. The priority score p of the nodes with updated s scores will have to also get updated by delta s so that the priority score reflects the update in s scores that need to be propagated further.

Target push ranking algorithms operate under the principle that a connecting institution that is dedicated towards promoting the target institution will have less connections to other institutions in projection graph 300, and vice versa. Therefore, connecting institutions with a lower number of connections to other institutions should inherit more target institutions' target ratings.

Referring back to FIG. 1, at step 125, method 100 determines a trajectory score for each producer 205 by utilizing the PageRank centrality ranking associated with each institution 210 that has a relationship 215 with each producer 205. As producers 205 grow in acclaim and prestige in the global market network over time, the trajectories T of those producers 205 may also evolve, thus changing the producer's trajectory score over time. Therefore, method 100 first determines the trajectory $T_{j,t}$ for a producer j up to a time t, according to the following equation:

$$T_{j,t} = \{e | e \in T_j, t_e <= t\} \quad \text{(Equation 6)}$$

Using the trajectory $T_{j,t}$ for producer j up to a time t, method 100 then determines the trajectory score $A^*_{j,t}$ of producer j at time t by summing the ratings of each institution 210 that has a relationship 215 with producer j over the hyperparameter time period up to time t. The trajectory score $A^*_{j,t}$ may be defined by the following equation:

$$A^*_{j,t} = \Sigma_{(i,t_e,c) \in T_{j,t}} PR_i * W(c) \quad \text{(Equation 7)}$$

Wherein $\Sigma(i,t_e,c) \in T_{j,t}$ is the summation across producer j's trajectory $T_{j,t}$ of each institution 210 having a relationship 215 with producer j within the hyperparameter time period up to time t.

$PR_i$ is the PageRank centrality rating for each institution 210 having a relationship 215 with producer j within the hyperparameter time period up to time t.

$W(c)$ is a weight function that assigns weights to a class of events based on type of event c. Applying the weight function $W(c)$ to the PageRank centrality rating for each institution 210 having a relationship 215 with producer j allows method 100 to score the same trajectory $T_{j,t}$ for producer j differently based on a significance of the type of event c in each relationship 215. In some embodiments, the weight function $W(c)$ may initially be assigned to one such that all types of events are weighted equally in determining the trajectory scores for each producer 205. It should be understood by those skilled in the art that various weight functions may be used in other embodiments of the present disclosure and not exhaustively described herein.

Upon determining the trajectory score $A^*_{j,t}$ for each producer j in Equation 7 above, method 100 may utilize the time-dependent trajectory scores $A^*_{j,t}$ of each producer j to determine a performance score for each institution i (see step 130 in FIG. 1). Referring to step 130 in FIG. 1, method 100 determines the performance score for each institution i by summing a delta trajectory score of each producer j that has a relationship 215 with each institution i over the hyperparameter time period. In other words, the performance score of each institution i at any given time t is measured by comparing the growth of producers 205 who have a relationship 215 with that institution 210 between time t and time t+∈. The performance score $P_{i,t}$ may be defined by the following equation:

$$P_{i,t} = \Sigma j \in \{a|(i_e,a,t_e,c) \in \Omega, t_e=t, i_e=i\}(A^*_{j,t+\in} - A^*_{j,t}) \quad \text{(Equation 8)}$$

Wherein $\{a|(i_e, a, t_e, c) \in \Omega, t_e=t, i_e=i\}$ is the set of all producers 205 with a relationship 215 with institution 210 at time t.

$(A^*_{j,t+\in} - A^*_{j,t})$ is the delta trajectory score for each producer j with a relationship 215 with institution i, wherein $A^*_{j,t+\in}$ is producer j's trajectory score at the end of the hyperparameter time period and $A^*_{j,t}$ is producer j's trajectory score at the beginning of the hyperparameter time period.

∈ is a hyperparameter controlling the hyperparameter time period over which producer j's trajectory score may change, as explained above. In some embodiments, ∈ is set to be greater than zero (∈>0) to ensure that the delta trajectory score is not zero.

The performance score $P_{i,t}$ for each institution 210 allows method 100 to determine whether curators of that institution 210 are successful in selectively promoting producers 205 with positive trajectories T and whom go on to improve in their trajectory scores $A^*_{j,t}$. If an institution 210 frequently promotes producers 205 with positive trajectories T, then that institution 210 will increase its own performance score.

According to embodiments of the present disclosure, institutions 210 may obtain a high performance score under two different scenarios: 1) the institution 210 forms relationships 215 with producers 205 that already have high trajectory scores (e.g., a gallery exhibits artwork from well-known artists), or 2) the institution 210 forms relationships 215 with producers 205 that do not have high trajectory scores initially, but through relationships 215 with institution 210, producer 205 increases its trajectory score over time (e.g., a gallery that helps promote emerging new artists by exhibiting their artwork, thereby helping the new artists to accrue acclaim over time). It would be beneficial for new methods of the present disclosure to distinguish between institutions 210 with the same high performance score but operating under different scenarios, as explained above. This is achieved by determining the performance score for institutions 210 based on a selected category of producers and a selected category of institutions, as explained in further detail below with reference to FIG. 4.

Figure 4:
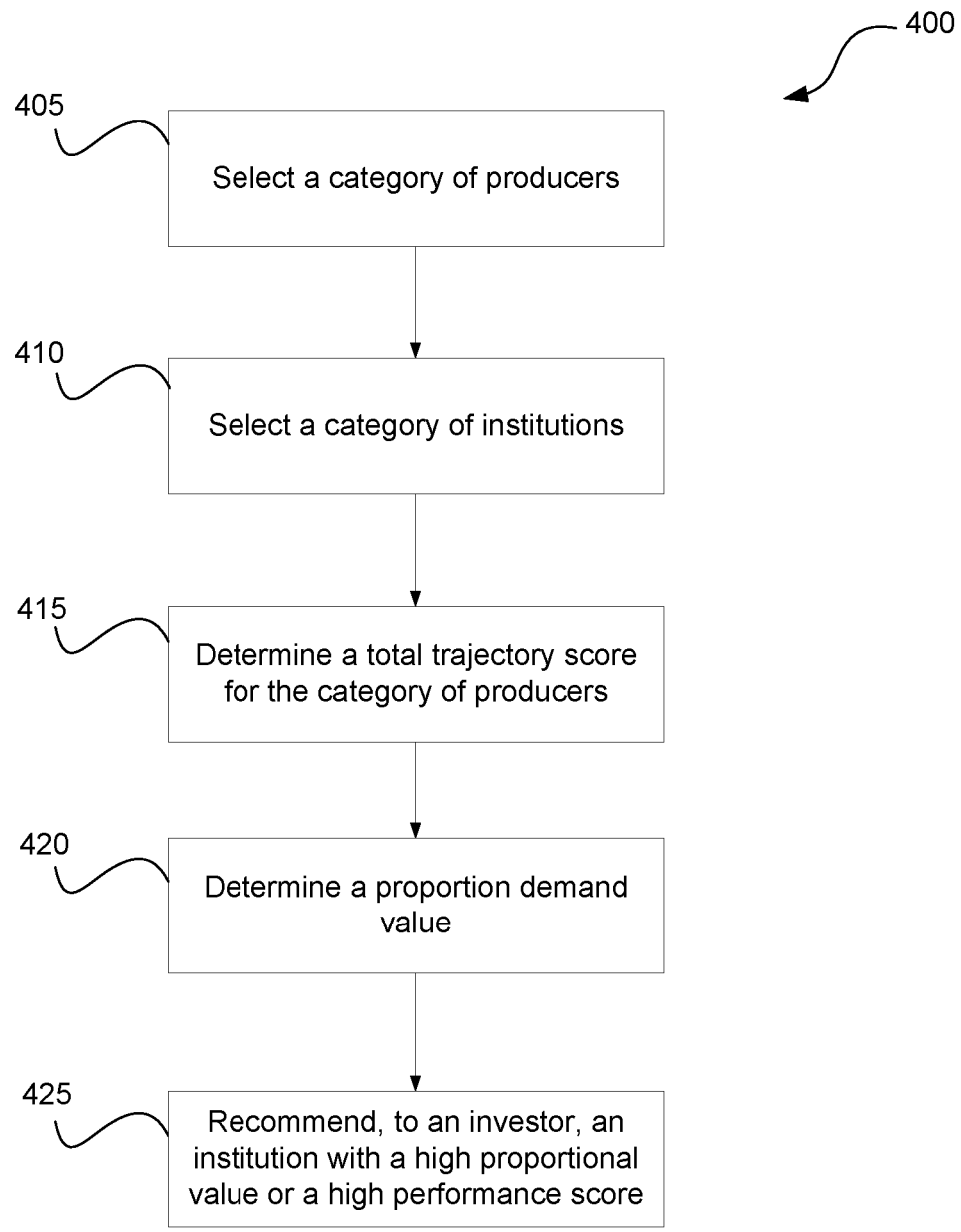
FIG. 4 shows a flowchart illustrating a method for determining a proportional demand value, according to an embodiment of the present disclosure.

FIG. 4 shows a flowchart illustrating a method 400 for determining a demand score for institutions in the global market network based on a selected category of producers and a selected category of institutions, according to an embodiment of the present disclosure. At step 405, method 400 selects a category of producers ($A_c$) based on a characteristic that is common to the category of producers. For example, the category of producers may include women artists, LGBTQ artists, minority artists, etc. At step 410, method selects a category of institutions ($I_c$) based on a characteristic that is common to the category of institutions. For example, the category of institutions may include New York institutions, Los Angeles institutions, The Museum of Modern Art (MoMA), etc. It should be understood by those skilled in the art that various other categories of producers and institutions may be selected in other embodiments of the present disclosure and not exhaustively described herein. Moreover, group of artists may be chosen based on their proximity to a target group of institutions, as described above, such that the target rating of institutions may be used to detect artist trajectories that are closer in reaching a target institution group.

At step 410 in FIG. 4, the category of institutions can be selected in different ways in various embodiments of the present disclosure. In some embodiments, the category of institutions may be selected based on the performance score in Equation 8 above. By utilizing the performance score, methods of the present disclosure may select the category of institutions that is focused on promoting the category of producers 205 selected in step 405. This automatically creates a high potential group of institutions for the selected group of artists without requiring any other criteria from a user. In some embodiments, the category of institutions may be selected based on the PR*-P* plane as described above. Similarly, utilizing the PR*-P* plane allows methods of the present disclosure to automate the selection process for the category of institutions for users with limited knowledge of which institutions best promote the selected category of producers.

At step 415 in FIG. 4, method 400 determines the total trajectory score D(t, $i_c$, $A_c$) of the category of producers selected in step 405 that have relationships 215 with institutions 210 selected in step 410 at time t. This is done by summing the trajectory score for each producer 205 in the selected category of producers over the hyperparameter time period, as defined by the following equation:

$$D_{(t,I_c,A_c)} = \sum_{j \in \Omega_t^{I_c}} A^*_{j,t} * 1(j, A_c) \quad \text{(Equation 9)}$$

Wherein $A^*_{j,t}$ is the trajectory score for producer j that is summed over the hyperparameter time period.

In some embodiments, 1(j, $A_c$) is a function that outputs 1 only when producer j is included in the category of producers $A_c$ selected in step 405. Otherwise, if producer j is not included in the category of producers $A_c$ selected in step 405, then function 1(j, $A_c$) outputs 0 and the trajectory score for producer j is not included in the summation to determine the total trajectory score.

$\Omega_t^{I_c} = \{j | (i, j, t_e, c) \in \Omega, i \in I_c, t_e = t\}$ represents the producers 205 associated with the subset of relationships 215 that occurred in institutions $I_c$ selected in step 410 in FIG. 4 at time t.

At step 420 in FIG. 4, method 400 determines a proportional demand value for the selected group of producers from the selected group of institutions over the total trajectory score of all producers represented at those institutions at a given time t. This proportional demand value is calculated by dividing Equation 9 above by the summation of the trajectory scores $A^*_{j,t}$ of all producers 205, as defined by the following equation:

$$D^*_{(t,I_c,A_c)} = D_{(t,I_c,A_c)} / \sum_{j \in \Omega_t^{I_c}} A^*_{j,t} \quad \text{(Equation 10)}$$

According to Equation 10 above, a high proportional demand value for an institution 210 signifies that over all artists who have been curated for the institution 210, a significant level of that demand has been allocated to the selected category of producers. Since curating artists with higher level of recognition, as represented by higher trajectory scores, requires higher resources from institutions, therefore each institution has to curate their demand for artists accordingly. Equation 10 above represents how significant the demand for a group of artists is relative to all artists curated.

Referring to FIG. 4, at step 425, method 400 may recommend to an investor to invest in an institution 210 with a high proportional demand value, as obtained in Equation 10, or a high performance value, as described above. The investor may tailor this recommendation to his/her personal preferences and unique tastes by selecting a specific category of producers (e.g., women artists), selecting a specific category of institutions (e.g., New York museums), or both.

It should be understood by those skilled in the art that in other embodiments of the present disclosure, method 400 may determine the demand and performance scores for institutions based solely on a selection of a category of producers or solely on a selection of a category of institutions. In other embodiments of the present disclosure, method 400 may determine the demand score for institutions based on a combination of both a selection of a category of producers and a category of institutions. Furthermore, it should be understood by those skilled in the art that some operations of method 400 may be performed in a different order and/or vary, and method 400 may include more operations that are not described herein for simplicity.

Figure 5:
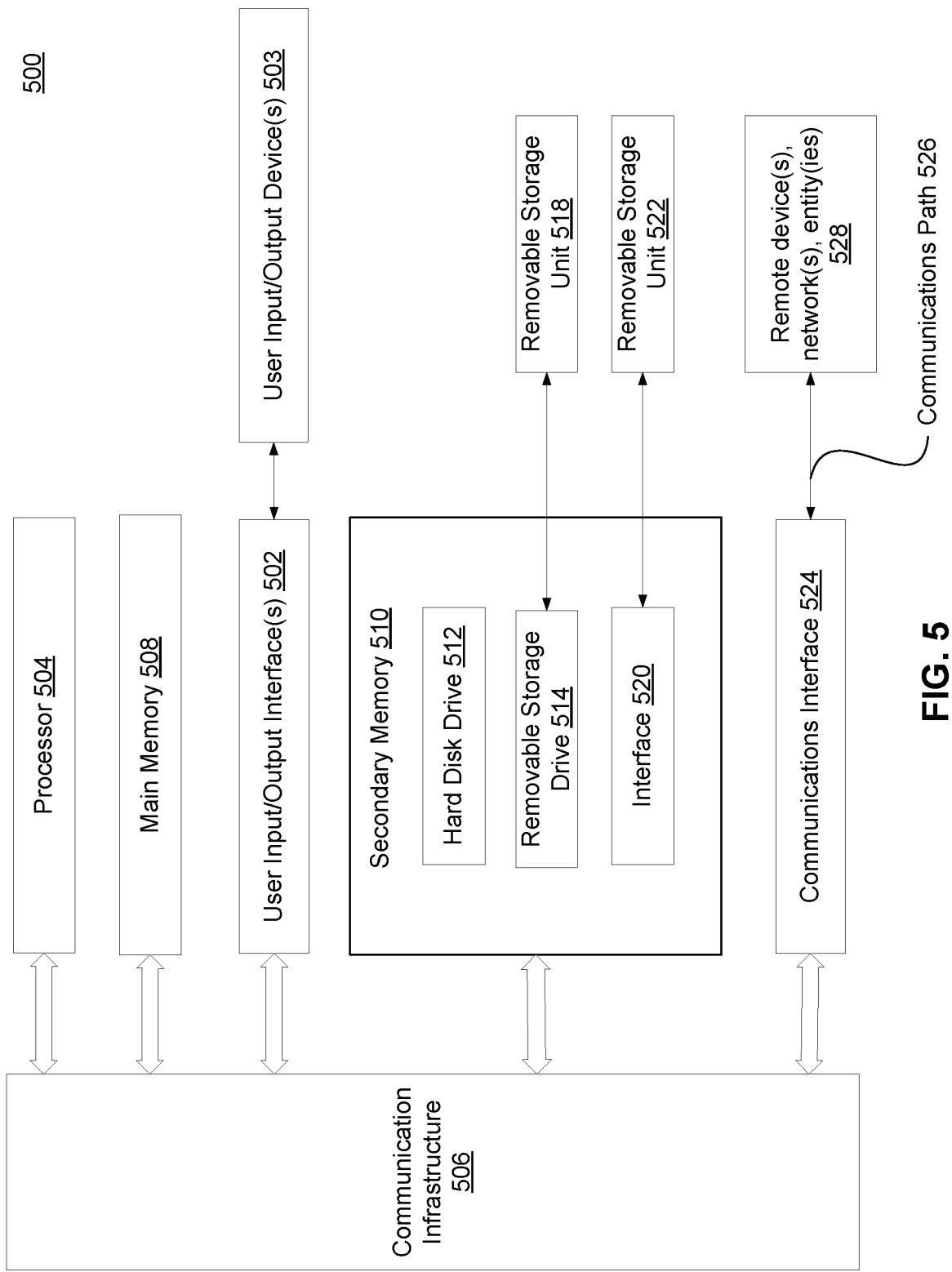
FIG. 5 illustrates an exemplary computer system capable of implementing the methods illustrated in FIGS. 1 and 4 of the present disclosure, according to one embodiment of the present disclosure.

FIG. 5 illustrates an exemplary computer system capable of implementing the method for measuring demand in a market according to one embodiment of the present disclosure.

Various embodiments may be implemented, for example, using one or more well-known computer systems, such as a computer system 500, as shown in FIG. 5. One or more computer systems 500 may be used, for example, to implement any of the embodiments discussed herein, as well as combinations and sub-combinations thereof. The computer system 500 may be used to implement methods 100 and 400, generate dynamic graph 200, generate projection graph 300, generate trajectory scores for producers 205, generate performance scores for institutions 210, and so on as described above with reference to FIGS. 1-4.

The computer system 500 may include one or more processors (also called central processing units, or CPUs), such as a processor 504. The processor 504 may be connected to a communication infrastructure or bus 506.

The computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 500 may also include a main or primary memory 508, such as random access memory (RAM). Main memory 508 may include one or more levels of cache. Main memory 508 may have stored therein control logic (i.e., computer software) and/or data.

The computer system 500 may also include one or more secondary storage devices or memory 510. The secondary memory 510 may include, for example, a hard disk drive 512 and/or a removable storage device or drive 514. The removable storage drive 514 may be a floppy disk drive, a magnetic tape drive, a compact disk drive, an optical storage device, tape backup device, and/or any other storage device/drive.

The removable storage drive 514 may interact with a removable storage unit 518. The removable storage unit 518 may include a computer usable or readable storage device having stored thereon computer software (control logic) and/or data. The removable storage unit 518 may be a floppy disk, magnetic tape, compact disk, DVD, optical storage disk, and/any other computer data storage device. The removable storage drive 514 may read from and/or write to the removable storage unit 518.

The secondary memory 510 may include other means, devices, components, instrumentalities or other approaches for allowing computer programs and/or other instructions and/or data to be accessed by the computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 524. The communication interface 524 may enable the computer system 500 to communicate and interact with any combination of external devices, external networks, external entities, etc. (individually and collectively referenced by reference number 528). For example, the communication interface 524 may allow the computer system 500 to communicate with the external or remote devices 528 over communications path 526, which may be wired and/or wireless (or a combination thereof), and which may include any combination of LANs, WANs, the Internet, etc. Control logic and/or data may be transmitted to and from the computer system 500 via the communications path 526.

The computer system 500 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, when executed by one or more data processing devices (such as the computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

The claims in the instant application are different than those of the parent application or other related applications. The Applicant, therefore, rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method, comprising:
based on constructing a latent network of a plurality of stakeholders comprising buyers, sellers, museums and art institutions that drive values in an art market, identifying a plurality of influencers within the plurality of stakeholders in the art market and measuring impact factors of the plurality of influencers, wherein the plurality of influencers comprises a plurality of producers and a plurality of institutions;
gathering data representing a plurality of events defining relationships between the plurality of producers and the plurality of institutions, each event comprising information defining at least a time of event and a type of event;
determining a trajectory for each producer of the plurality of producers, the trajectory for a particular producer including a group of events of the plurality of events that involve the particular producer;
based on the trajectory for each producer of the plurality of producers, generating a dynamic graph specifying the relationships between the plurality of producers and the plurality of institutions for a hyperparameter time period;
generating a projection graph from the dynamic graph such that the projection graph specifies only the relationships between institutions of the plurality of institutions;
generating a rating for each institution of the plurality of institutions specified in the projection graph, comprising:
identifying, on the projection graph, a target node of the plurality of institutions with a propagated rating value;
identifying connecting institutions that are connected to the target node on the projection graph;
determining the rating for each connecting institution based on how many connections each connecting institution has to other institutions on the projection graph; and
recommending a category of producers based on the determined rating for each connecting institution;
determining a trajectory score for each producer, the trajectory score for the particular producer being a summation of the rating of each institution that has a relationship with the particular producer over the hyperparameter time period;
determining a proportional demand value, wherein the proportional demand value is a total trajectory score divided by a summation of the trajectory scores for each producer in the plurality of producers over the hyperparameter time period;
determining a performance score for each institution, the performance score for a particular institution being a summation of a delta trajectory score of each producer that has a relationship with the particular institution over the hyperparameter time period; and
outputting a recommendation to invest in an institution in the art market having at least one of a high proportional demand value or a high performance score.

2. The method according to claim 1, wherein determining the trajectory score for the particular producer further comprises:
applying a weight to the rating of each institution that has a relationship with the particular producer, wherein
the weight is a function that is assigned based on the type of event of the relationship between each institution and the particular producer.

3. The method according to claim 1, further comprising:
selecting the category of producers from the plurality of producers with a first characteristic that is common to the category of producers;
determining the total trajectory score for the category of producers, wherein the total trajectory score is a summation of the trajectory score for each producer in the category of producers over the hyperparameter time period.

4. The method according to claim 3, further comprising:
selecting a category of institutions from the plurality of institutions with a second characteristic that is common to the category of institutions.

5. The method according to claim 4, wherein selecting the category of institutions comprises at least one of
selecting institutions to form the category of institutions based on the performance score of each institution, and
selecting institutions to form the category of institutions based on PageRank centrality algorithms.

6. The method according to claim 4, wherein
a high proportional demand value signifies that over all producers who have been curated for the particular institution, a significant level of demand has been allocated to the selected category of producers, and
a low proportional demand value signifies that over all producers who have been curated for the particular institution, an insignificant level of demand has been allocated to the selected category of producers.

7. The method according to claim 1, further comprising:
generating the rating for each institution of the plurality of institutions specified in the projection graph using PageRank centrality algorithms.

8. The method according to claim 1, wherein
a connecting institution with a low number of connections to other institutions on the projection graph inherits a rating that is closer to the propagated rating value, and
a connecting institution with a high number of connections to other institutions on the projection graph inherits a rating that is further from the propagated rating value.

9. A system, comprising:
a memory for storing instructions;
one or more processors, communicatively coupled to the memory, configured to execute the instructions, the instructions causing the one or more processors to:
based on constructing a latent network of a plurality of stakeholders comprising buyers, sellers, museums and art institutions that drive values in an art market, identify a plurality of influencers within the plurality of stakeholders in the art market and measure impact factors of the plurality of influencers, wherein the plurality of influencers comprises a plurality of producers and a plurality of institutions;

gather data representing a plurality of events defining relationships between the plurality of producers and the plurality of institutions, each event comprising information defining at least a time of event and a type of event;

determine a trajectory for each producer of the plurality of producers, the trajectory for a particular producer including a group of events of the plurality of events that involve the particular producer;

based on the trajectory for each producer of the plurality of producers, generate a dynamic graph specifying the relationships between the plurality of producers and the plurality of institutions for a hyperparameter time period;

generate a projection graph from the dynamic graph such that the projection graph specifies only the relationships between institutions of the plurality of institutions;

generate a rating for each institution of the plurality of institutions specified in the projection graph, comprising:
identifying, on the projection graph, a target node of the plurality of institutions with a propagated rating value;
identifying connecting institutions that are connected to the target node on the projection graph;
determining the rating for each connecting institution based on how many connections each connecting institution has to other institutions on the projection graph; and
recommending a category of producers based on the determined rating for each connecting institution;

determine a trajectory score for each producer, the trajectory score for the particular producer being a summation of the rating of each institution that has a relationship with the particular producer over the hyperparameter time period;

determine a proportional demand value, wherein the proportional demand value is a total trajectory score divided by a summation of the trajectory scores for each producer in the plurality of producers over the hyperparameter time period;

determine a performance score for each institution, the performance score for a particular institution being a summation of a delta trajectory score of each producer that has a relationship with the particular institution over the hyperparameter time period; and output a recommendation to invest in an institution in the art market having at least one of a high proportional demand value or a high performance score.

10. The system according to claim 9, wherein the plurality of producers are artists.

11. The system according to claim 9, wherein the type of event is a categorical variable comprising at least one of exhibitions, shows, collections, and auctions.

12. The system according to claim 9, wherein the delta trajectory score of each producer is defined by a trajectory score of each producer at an end of the hyperparameter time period minus a trajectory score of each producer at a beginning of the hyperparameter time period.

13. The system according to claim 9, wherein the instructions further cause the one or more processors to determine the trajectory score for the particular producer by:
applying a weight to the rating of each institution that has a relationship with the particular producer, wherein the weight is a function that is assigned based on the type of event of the relationship between each institution and the particular producer.

14. The system according to claim 9, wherein the instructions further cause the one or more processors to:
select the category of producers from the plurality of producers with first a characteristic that is common to the category of producers; and
determine the total trajectory score for the category of producers, wherein the total trajectory score is a summation of the trajectory score for each producer in the category of producers over the hyperparameter time period.

15. The system according to claim 14, wherein
a high proportional demand value signifies that over all producers who have been curated for the particular institution, a significant level of demand has been allocated to the selected category of producers, and
a low proportional demand value signifies that over all producers who have been curated for the particular institution, an insignificant level of demand has been allocated to the selected category of producers.

16. The system according to claim 9, wherein the instructions further cause the one or more processors to:
select a category of institutions from the plurality of institutions with a second characteristic that is common to the category of institutions.

17. The system according to claim 16, wherein selecting the category of institutions comprises at least one of
selecting institutions to form the category of institutions based on the performance score of each institution, and
selecting institutions to form the category of institutions based on PageRank centrality algorithms.

18. A non-transitory, tangible computer-readable device having instructions stored thereon that, when executed by at least one computing device, cause the at least one computing device to perform operations comprising:
based on constructing, by the at least one computing device, a latent network of a plurality of stakeholders comprising buyers, sellers, museums and art institutions that drive values in an art market, identifying a plurality of influencers within the plurality of stakeholders in the art market and measuring impact factors of the plurality of influencers, wherein the plurality of influencers comprises a plurality of producers and a plurality of institutions;
gathering, by the at least one computing device, data representing a plurality of events defining relationships between a plurality of producers and a plurality of institutions, each event comprising information defining at least a time of event and a type of event;
determining, by the at least one computing device, a trajectory for each producer of the plurality of producers, the trajectory for a particular producer including a group of events of the plurality of events that involve the particular producer;
based on the trajectory for each producer of the plurality of producers, generating a dynamic graph specifying the relationships between the plurality of producers and the plurality of institutions for a hyperparameter time period;
generating a projection graph from the dynamic graph such that the projection graph specifies only the relationships between institutions of the plurality of institutions;

generating a rating for each institution of the plurality of institutions specified in the projection graph, comprising:
  identifying, on the projection graph, a target node of the plurality of institutions with a propagated rating value;
  identifying connecting institutions that are connected to the target node on the projection graph;
  determining the rating for each connecting institution based on how many connections each connecting institution has to other institutions on the projection graph; and
  recommending a category of producers based on the determined rating for each connecting institution;
determining, by the at least one computing device, a trajectory score for each producer, the trajectory score for the particular producer being a summation of a rating of each institution that has a relationship with the particular producer over the hyperparameter time period;
determining by the at least one computing device, a proportional demand value, wherein the proportional demand value is a total trajectory score divided by a summation of the trajectory scores for each producer in the plurality of producers over the hyperparameter time period;
determining, by the at least one computing device, a performance score for each institution, the performance score for a particular institution being a summation of a delta trajectory score of each producer that has a relationship with the particular institution over the hyperparameter time period; and
outputting, by the at least one computing device, a recommendation to invest in an institution in the art market having at least one of a high proportional demand value or a high performance score.

* * * * *